(12) United States Patent
Kosteva et al.

(10) Patent No.: US 9,036,618 B1
(45) Date of Patent: May 19, 2015

(54) METHOD AND SYSTEM FOR PROVIDING VOICE ASSISTED CONFIGURATION ON AN INTERNET PROTOCOL (IP) TELEPHONE

(75) Inventors: Glenn Kosteva, Westford, MA (US); Robert McGurrin, Arlington, MA (US); Michael McCormack, Gloucester, MA (US); Ronald Fowler, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2085 days.

(21) Appl. No.: 11/078,955

(22) Filed: Mar. 11, 2005

(51) Int. Cl.
*H04M 1/253* (2006.01)
*G10L 15/22* (2006.01)

(52) U.S. Cl.
CPC ....... *H04M 1/2535* (2013.01); *G10L 2015/223* (2013.01)

(58) Field of Classification Search
USPC ................................ 370/352, 401; 379/93.07
See application file for complete search history.

(56) References Cited

U.S. PATENT DOCUMENTS

| | | | |
|---|---|---|---|
| 6,615,276 B1 * | 9/2003 | Mastrianni et al. | 709/250 |
| 6,683,870 B1 * | 1/2004 | Archer | 370/356 |
| 7,286,521 B1 * | 10/2007 | Jackson et al. | 370/352 |
| 7,310,328 B2 * | 12/2007 | Katoh | 370/352 |
| 2001/0018656 A1 * | 8/2001 | Weik et al. | 704/270.1 |
| 2002/0196776 A1 * | 12/2002 | Chiang | 370/352 |
| 2003/0060210 A1 * | 3/2003 | Ravishankar et al. | 455/452 |
| 2003/0097438 A1 * | 5/2003 | Bearden et al. | 709/224 |
| 2004/0030785 A1 * | 2/2004 | Katoh | 709/227 |
| 2004/0095900 A1 * | 5/2004 | Siegel | 370/328 |
| 2004/0116140 A1 * | 6/2004 | Babbar et al. | 455/517 |
| 2004/0125923 A1 * | 7/2004 | See et al. | 379/88.17 |
| 2004/0170163 A1 * | 9/2004 | Yik et al. | 370/389 |
| 2005/0128955 A1 * | 6/2005 | Chang et al. | 370/252 |
| 2005/0238142 A1 * | 10/2005 | Winegarden | 379/45 |
| 2006/0187900 A1 * | 8/2006 | Akbar | 370/352 |
| 2006/0268750 A1 * | 11/2006 | Weiner | 370/260 |
| 2008/0057903 A1 * | 3/2008 | Fieldhouse et al. | 455/405 |

\* cited by examiner

*Primary Examiner* — Omar Ghowrwal (57) ABSTRACT

Method and system for providing voice assisted configuration on an IP telephone in a non-DHCP environment includes detecting a data packet including the IP telephone terminal MAC address, transmitting a configuration terminal MAC address in response to detected IP telephone MAC address, and configuring the IP telephone terminal in the non-DHCP layer 2 environment by assigning an IP address, a gateway address, a subnet mask, and additional parameters such as audio and noise level adjustment so that the IP telephone terminal is configured to fully function in the data network. Additional VOIP telephone terminals in the local area network may be configured by the configuration terminal.

1 Claim, 5 Drawing Sheets

METHOD AND SYSTEM FOR PROVIDING VOICE ASSISTED CONFIGURATION ON AN INTERNET PROTOCOL (IP) TELEPHONE

FIELD OF THE INVENTION

The present invention relates to internet protocol (IP) telephony. More specifically, the present invention relates to method and system for providing voice assisted configuration on an IP telephone in a data network

BACKGROUND

In a typical data network (for example, in a corporate data network setting) deploying Voice over IP (Internet Protocol) telephones (hereinafter referred to as VOIP phones), the VOIP phones generally are connected to a data network (for example, the corporate LAN) and other terminals such as personal computer terminals. A typical VOIP phone configuration procedure may include communicating with a DHCP (Dynamic Host Configuration Protocol) server service in the data network that operates to allocate the IP addresses for each VOIP phones on the network, and allows the advanced configuration of network settings (such as DNS servers, for example).

In this manner, the VOIP phone operating as a DHCP client may automatically receive the IP address from the DHCP server which is configured to assign the proper IP address for each DHCP client connected to the data network. Such configuration, however, requires that the user of the VOIP phone configure the phone on the data network with the information provided by the DHCP server using the user interface on the VOIP phone.

More specifically, at the initial VOIP phone configuration stage, the phone generally does not contain the necessary parameters to function as a phone. Furthermore, in the case where the VOIP phone is set up to operate in a non-DHCP layer 2 environment, the VOIP phone does not have an IP address assigned to it to communicate outside of its own subset. In this case, the VOIP phone configuration would require manual input of the information through an interface of the VOIP phone. However, while VOIP phones with user interface such as display units are generally available, these higher end units are expensive. There are less expensive VOIP phones that do not have a visual interface for the user. However, without a user interface such as a display, the configuration of the VOIP phone is a challenge.

VOIP phones with limited user interface capabilities in a non-DHCP environment would require manual configuration using a local user interface and a keypad to enter the parameters without any system feedback. Alternatively, each VOIP phone in the data network may be individually programmed using a command tool that would write the parameters to the phone memory also without any system support or feedback. These approaches, however, are prone to error, slow and tedious, inefficient and pose challenges in scalability.

In view of the foregoing, it would be desirable to have a method and a system which would allow voice assisted configuration of VOIP phones that do not have a visual user interface such as a display screen in a data network. Additionally, it would be desirable to have a method and a system which would allow configuration of multiple VOIP phones in an environment which does not include a DHCP server service that would assign the proper IP address to the VOIP phones in the data network.

SUMMARY OF THE INVENTION

In view of the foregoing, in accordance with one embodiment of the present invention, a method of configuring a voice over internet protocol telephone terminal includes the steps of detecting a terminal identifier address, transmitting a configuration unit identifier address, configuring the terminal associated with the terminal identifier address, where the configuring step includes the step of transmitting one or more voice commands to the terminal associated the terminal identifier address.

The method in one embodiment may include the step of establishing a voice enabled communication to and/or from the terminal.

Moreover, the method may also include in one embodiment the step of transmitting one or more voice responses to the terminal responsive to a respective one or more of user inputs from the terminal.

In one embodiment, the configuration step may include the steps of receiving a voice configuration request from the terminal, transmitting a voice command to the terminal responsive to the voice configuration request.

The step of detecting a terminal identifier address may include detecting a multicast data packet including the terminal identifier address. Also, the terminal identifier address may include a terminal MAC address, and further where the configuration unit identifier may include a configuration unit MAC address.

The step of configuring the terminal may also include the step of assigning an internet protocol (IP) address, a gateway address and a subnet mask information associated with the terminal, and also, where the configuration step may also include the step of configuring one or more parameters associated with the terminal.

In one embodiment, the one or more parameters may include a voice level parameter, a noise level parameter, and a user account parameter, each associated with the terminal.

Further, in an additional embodiment, the configuring step may include the step of receiving one or more voice responses, each responsive to the transmitted one or more voice commands, and also, may include the step of generating one or more parameters associated with the terminal.

The one or more parameters in one embodiment may include an IP address, a gateway address and a subnet mask information.

In a further embodiment, the method may further include step of configuring the terminal with the generated one or more parameters. Moreover, the detecting, transmitting and configuring steps in yet another embodiment may be performed in layer 2 non-DHCP environment.

Additionally, in still a further embodiment, the method may also include the steps of receiving from the terminal a voice command associated with configuration of one or more additional terminals, and configuring the one or more additional terminals, where the step of configuring may in one embodiment further include the steps of transmitting a voice signal requesting one or more parameters for configuration of the one or more additional terminals. receiving the one or more parameters from the terminal, and transmitting one or more configuration parameters to each of the one or more additional terminals associated with a respective configuration procedure.

In this embodiment, the method may also include the step of receiving a data signal from each of the one or more additional terminals associated with the respective configuration procedures, where the received data signal in one aspect of the present invention, may be indicative of the successful completion of the respective one or more additional terminal configuration procedure.

A method of configuring a plurality of voice over interne protocol telephone terminals in accordance with another embodiment of the present invention includes detecting a terminal identifier address, transmitting a configuration unit identifier address, establishing a voice signal communication with a telephone terminal associated with the terminal identifier address, receiving a configuration request voice signal from the terminal, and transmitting a voice command to the terminal responsive to the voice configuration request.

In one embodiment, the method may further include the steps of receiving from the terminal a voice command associated with configuration of one or more additional terminals, transmitting to the terminal a voice signal requesting one or more parameters for configuration of the one or more additional terminals, receiving the one or more parameters from the terminal, and transmitting one or more configuration parameters to each of the one or more additional terminals associated with a respective configuration procedure.

A system for performing configuration of a telephone terminal in accordance with yet another embodiment of the present invention includes a local area network, a telephone terminal operatively coupled to the local area network, the telephone terminal configured to transmit a telephone terminal MAC address, a configuration unit operatively coupled to the local area network, the configuration unit configured to detect the telephone terminal MAC address, and in response thereto, further configured to transmit a configuration unit MAC address, where the configuration unit is further configured to establish a voice enabled communication path with the telephone terminal, and further, to assign an IP address, a gateway address, and a subnet mask information to the telephone terminal over the voice enabled communication path.

In a further embodiment, the system may further include a data network operatively coupled to the local area network, a configuration server operatively coupled to the local area network, where the configuration unit is configured to communicate with the configuration server over the data network to retrieve one or more parameters associated with the telephone terminal, and further, where the telephone terminal, the configuration unit, and the local area network are in a non-DHCP environment.

In this manner, in accordance with the various embodiments of the present invention, VOIP phones may be configured to operate in a non-DHCP environment using a voice assisted configuration approach under a layer 2 protocol data communication to provide instructions to the VOIP phone for initial configuration of the VOIP phone. Additionally, within the scope of the present inventions, multiple VOIP phones coupled to the local area network may be configured by the configuration unit upon the voice assisted configuration of one VOIP phone in the local area network. As such, the voice assisted configuration of the VOIP phones in accordance with the present invention provides a simple audio enabled configuration approach with system support and feedback to verify correct settings for the VOIP phones in non-DHCP environment where layer 3 and gateway access is not available.

These and other features and advantages of the present invention will be understood upon consideration of the following detailed description of the invention and the accompanying drawings.

DETAILED DESCRIPTION

Figure 1:
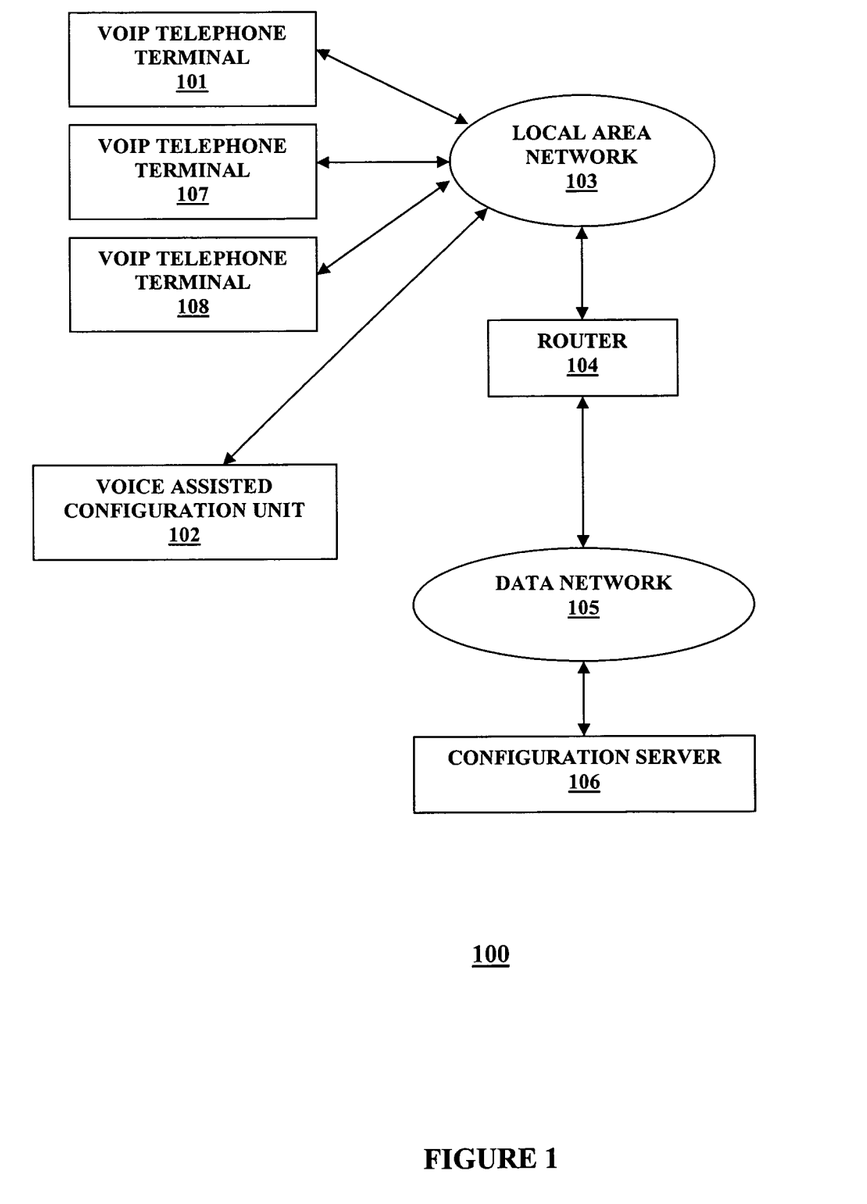
FIG. 1 illustrates a data network for practicing the voice assisted configuration of VOIP phones in accordance with one embodiment of the present invention.

FIG. 1 illustrates a data network for practicing the voice assisted configuration of VOIP phones in accordance with one embodiment of the present invention. Referring to the Figure, the overall system includes a plurality of VOIP telephone terminals 101, 107, 108 which require configuration to be set up for usage, and each of which is coupled to a local area network (LAN) 103. The connection between the VOIP telephone terminals 101, 107, 108 and the LAN 103 may include in one embodiment, an Ethernet connection. The LAN 103 as shown in the overall system 100 is coupled to a router 104 which is then connected to a data network 105. The data network 105 may include a corporate intranet data network, or alternatively, the interne, and further, where the router 104 may be firewalled for security.

Referring back to FIG. 1, also shown in the overall system is a voice assisted configuration unit 102 which is coupled to the LAN 103. As discussed in further detail below, the voice assisted configuration unit 102 may be configured in one embodiment to communicate with the VOIP telephone terminal 101 via the LAN 103 connection to assist the user of the VOIP telephone terminal 101 to configure the VOIP telephone terminal 101. Moreover, there is also provided a configuration server 106 which may be configured to provide configuration parameters to the voice assisted configuration unit 102 to perform the configuration or re-configuration of the VOIP telephone terminal 101. In one embodiment, upon completion of the voice assisted configuration of the VOIP telephone terminal 101, the configuration unit 102 may be further configured to initiate the configuration procedure of the VOIP telephone terminals 107 and 108 coupled to the LAN 103 in response to such configuration request received from the VOIP telephone terminal 101.

Referring yet again to FIG. 1, the connections to and from the router 104, and the connections to and from the data network 105 may include one or more of a wired connection such as an Ethernet cable connection, and a wireless connection using, for example, 801.11 g, 801.11b, 801.11a, Bluetooth, IrDA, or any other wireless communication protocols. Moreover, the voice assisted configuration unit 102 may in one embodiment be coupled to the LAN 103 via an Ethernet connection.

Figure 2:
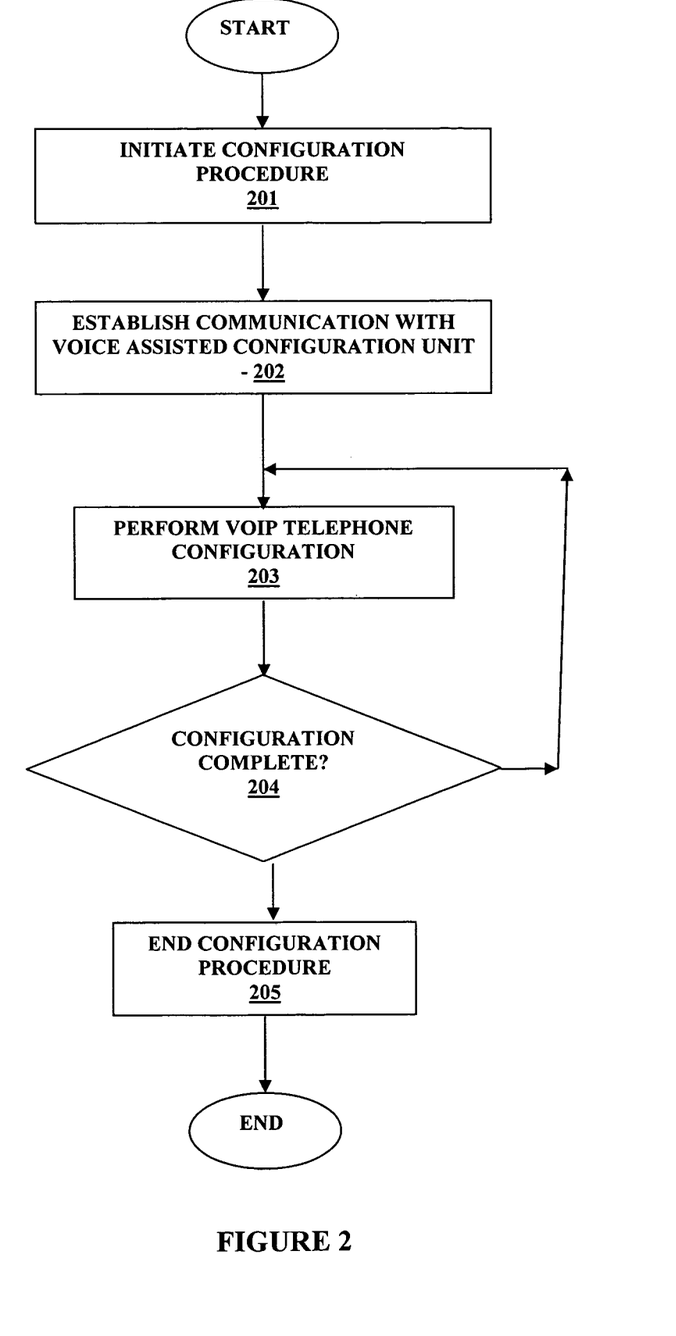
FIG. 2 is a flowchart illustrating the voice assisted configuration of a VOIP phone in accordance with one embodiment of the present invention.

FIG. 2 is a flowchart illustrating the voice assisted configuration of the VOIP phone 101 in accordance with one embodiment of the present invention. Referring to the Figure, at step 201, the VOIP telephone terminal 101 (FIG. 1) configuration procedure is initiated by, for example, the user at the VOIP telephone terminal 101 activating a configuration button or key. Alternatively, the VOIP telephone terminal 101 may be configured to initiate the configuration procedure by the user speaking into the receiver of the VOIP telephone terminal 101 the configuration initiate procedure command such as, for example, "start configuration".

In one embodiment, the VOIP telephone terminal 101 (FIG. 1) initiates the configuration procedure, for example, by transmitting out a multi-cast data packet over the LAN 103 including the MAC address of the VOIP telephone terminal 101.

Referring back to FIGS. 1 and 2, the voice assisted configuration unit 102 coupled to the LAN 103 is configured to detect the multicast data packet (e.g., source address of the VOIP telephone terminal) from the VOIP telephone terminal 101 (FIG. 1) and in response thereto, transmits to the VOIP telephone terminal 101 the MAC address of the voice assisted configuration unit 102. In this manner, and referring now to FIG. 2, at step 202, the communication between the VOIP telephone terminal 101 and the voice assisted configuration unit 102 is established.

Referring back to FIG. 2, thereafter at step 203, the VOIP telephone configuration procedure begins. More specifically, the user at the VOIP telephone terminal 101 is greeted with a voice command alerting the user that the VOIP telephone terminal 101 configuration procedure is initiated. More specifically, in one embodiment of the present invention, the user at the VOIP telephone terminal 101 will receive a voice prompt that greets the user into the beginning of the terminal configuration procedure. For example, in one embodiment of the present invention, the voice assisted configuration unit 102 (FIG. 1) may be configured to transmit a voice prompt to the VOIP telephone terminal 101 (FIG. 1) such as "Welcome to 3Com configuration service, please press # to continue with the configuration of your telephone terminal."

Referring back to FIG. 2, at step 203, the voice assisted configuration unit 102 (FIG. 1) performs the VOIP telephone terminal configuration procedure, using voice commands, to instruct the user at the VOIP telephone terminal 101 to, among others, input the necessary information in order to perform the configuration procedure. Thereafter at step 204, it is determined whether the configuration of the VOIP telephone terminal 101 is complete. If at step 204 it is determined that the configuration procedure is not complete, the routine returns to step 203 to continue with the configuration procedure.

On the other hand, if at step 204 it is determined that the VOIP telephone terminal 101 (FIG. 1) is configured to operate (e.g., configured with the necessary parameters to function as a VOIP telephone in the data network, including an IP address, gateway address and subnet mask information), then at step 205, the configuration procedure terminates, and the VOIP telephone terminal 101 is configured to operate as a telephone in either layer 2 or layer 3 environment. More specifically, the voice assisted configuration unit 102 may be configured to assign a unique IP address, a gateway address and a subnet mask for the VOIP telephone terminal 101 which would provide needed parameters to configure the VOIP telephone terminal 101 to operate as a telephone on the LAN 103. In one embodiment, the configuration procedure at step 203 (FIG. 2) may include other optional parameters such as voice level on the VOIP telephone terminal 101, and adjustment for the local ambient noise level such as noise level of the location of the VOIP telephone terminal 101 (e.g., small or large room setting).

Referring back to FIG. 2, during the VOIP telephone configuration procedure at step 203, the voice assisted configuration unit 102 (FIG. 2) may be configured to retrieve and/or transmit data to the configuration server 106 over the data network 105 for data that is pertinent to the configuration of the VOIP telephone terminal 101. In one embodiment, this interaction of the voice assisted configuration unit 102 and the configuration server 106 over the data network 105 may be transparent to the user at the VOIP telephone terminal 101 (FIG. 1). In other words, the VOIP telephone terminal 101 may not be aware of the data transmission between the voice assisted configuration unit 102 and the configuration server 106 over the data network 105. Moreover, as shown in FIG. 1, the connection between the voice assisted configuration unit 102 and the configuration server 106 over the data network 105 may not be limited to the LAN 103, but rather, the connection may be established through a firewalled router 104, for example. In one embodiment, the configuration server 106 may be physically located in a remote location relative to the location of the voice assisted configuration unit 102 and the VOIP telephone terminal 101.

Figure 3:
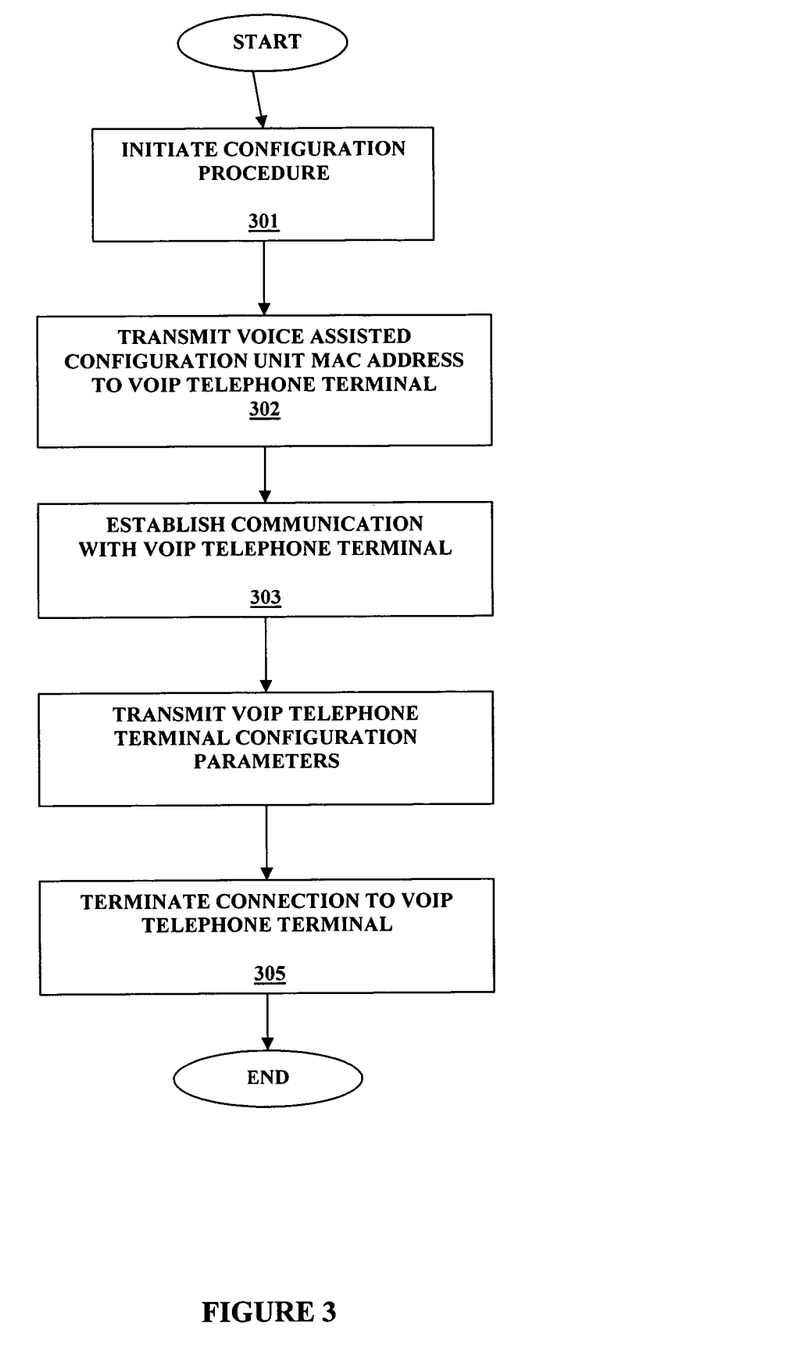
FIG. 3 is a flowchart illustrating the voice assisted configuration of a VOIP phone in accordance with another embodiment of the present invention.

FIG. 3 is a flowchart illustrating the voice assisted configuration of a VOIP phone in accordance with another embodiment of the present invention. Referring to the Figure, the step 301 to initiate the configuration procedure of the VOIP telephone terminal 101 (FIG. 1) is substantially similar to the step 201—that is, in the non-DHCP environment, the VOIP telephone terminal 101 is configured to transmit its MAC address over the LAN 103 operating in layer 2 environment. Thereafter at step 302, the voice assisted configuration unit 102 (FIG. 1) is configured to transmit its MAC address to the VOIP telephone terminal 101, and at step 303, the voice assisted configuration unit 102 establishes communication with the VOIP telephone terminal 101 to begin configuration process of the VOIP telephone terminal 101.

Referring to FIG. 3, the voice assisted configuration unit 101 at step 304 transmits the configuration parameters to the VOIP telephone terminal 101, and using voice commands to step the user through the configuration procedure. As discussed above, in one embodiment, the voice assisted configuration unit 102 is configured to assign an IP address, a gateway address and subnet mask information to the VOIP telephone terminal 101. Once configured in the layer 2 environment, the VOIP telephone terminal 101 is fully functional and configured to operate over the data network 105 (FIG. 1) in either layer 2 or layer 3 environment.

Referring back to FIG. 3, upon completion of configuration procedure to configure the VOIP telephone terminal 101 in the non-DHCP environment, the voice assisted configuration unit 102 at step 305 is configured to terminate the connection to the VOIP telephone terminal 101 over the LAN 103. In this manner, in accordance with one embodiment of the present invention, there is provided a simplified technique to configure a VOIP telephone terminal 101 in layer 2 non-DHCP environment.

Figure 4:
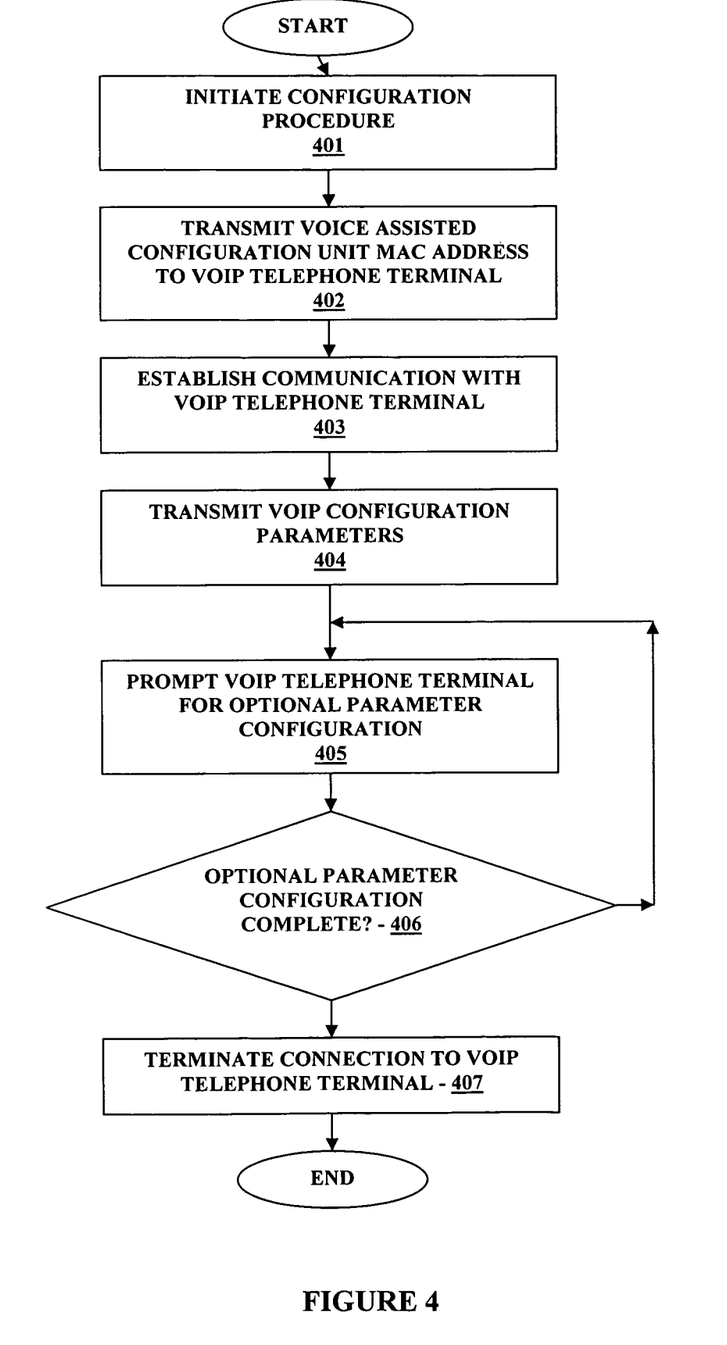
FIG. 4 is a flowchart illustrating the voice assisted configuration of VOIP phones in accordance with yet another embodiment of the present invention.

FIG. 4 is a flowchart illustrating the voice assisted configuration of VOIP phones in accordance with yet another embodiment of the present invention. Referring to the Figure, as can be seen, steps 401 through steps 404 are substantially similar to the respective corresponding steps 301 to steps 304 discussed above in conjunction with FIG. 3, and thus a description of these step 401 to step 404 are not repeated herein. More specifically, the VOIP telephone terminal 101 is initiated for configuration, and interacts with the voice assisted configuration unit 102 to configure the VOIP telephone terminal 101 over the LAN 103 in the non-DHCP layer 2 environment.

Referring back to FIG. 4, during the configuration procedure of the VOIP telephone terminal 101 by the voice assisted configuration unit 102, at step 405, the voice assisted configuration unit 102 is configured to prompt the VOIP telephone terminal 101 for optional parameter configuration for configuring the VOPI telephone terminal 101. In one embodiment, the optional parameters for configuring the VOIP telephone terminal 101 may include adjustment to the voice level for clarity, and modification to the noise level to adjust for ambient noise level.

For example, if the VOIP telephone terminal 101 is located in a large corporate setting susceptible to a high level of background noise, the voice assisted configuration unit 102 may be configured to prompt the user at the VOIP telephone terminal 101 to select, using the keypad on the VOIP telephone terminal 101 to select from a predefined noise level settings. Alternatively, the user may be prompted by the voice assisted configuration unit 102 to verbally select from a predefined noise level settings into the receiver of the VOIP telephone terminal 101. Once the user has selected from the predefined noise level settings, for example, the voice assisted configuration unit 102 is configured to communicate with the configuration server 106 (FIG. 1) over the data network 105 to retrieve the necessary parameters relevant to the noise level settings configuration, and accordingly, proceed with the configuration of the optional parameters of the VOIP telephone terminal 101.

While the noise level adjustment example is discussed above in conjunction with the optional parameter configuration of the VOIP telephone terminal 101, other optional parameter's, such as user account settings, and the VOIP telephone terminal 101 specific parameters, may be configured by the voice assisted configuration unit 102 to program the VOIP telephone terminal 101. In this manner, in one embodiment of the present invention, the voice assisted configuration unit 102 may be configured to communicate with the configuration server 106 over the data network 105 to execute the configuration procedure of the VOIP telephone terminal 101.

Referring back to FIG. 4, at step 406, it is determined whether the optional parameter configuration of the VOIP telephone terminal 101 is complete. If at step 406 it is determined that the optional parameter configuration of the VOIP telephone terminal 101 is not complete, then the routine returns to step 405, and the voice assisted configuration unit 102 is configured to continue with the configuration of the VOIP telephone terminal 101 with the optional parameters as discussed in detail above. On the other hand, if at step 406 it is determined that the optional parameter configuration of the VOIP telephone terminal 101 is complete, then at step 407, voice assisted configuration unit 102 terminates the connection to the VOIP telephone terminal 101 and the configuration of the VOIP telephone terminal 101 is complete.

Figure 5:
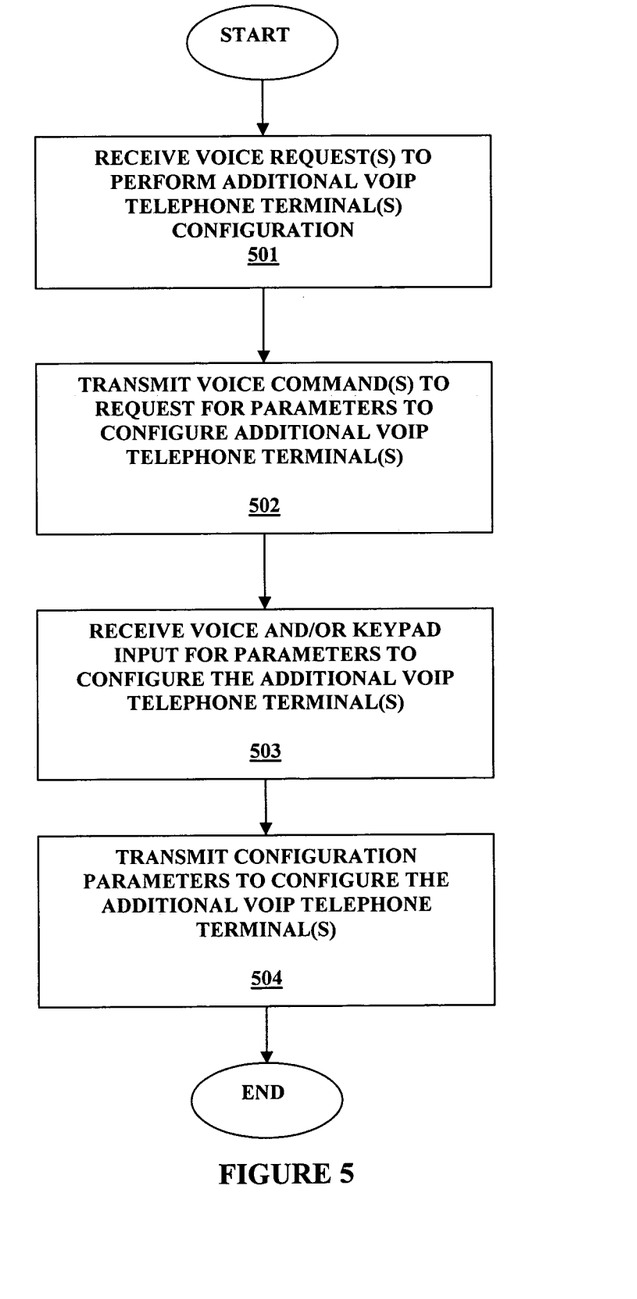
FIG. 5 is a flowchart illustrating the voice assisted configuration of multiple VOIP phones in accordance with a further embodiment of the present invention.

FIG. 5 is a flowchart illustrating the voice assisted configuration of multiple VOIP phones in accordance with a further embodiment of the present invention. Referring to the Figure, at step 501, in one embodiment of the present invention, the voice assisted configuration unit 102 receives a voice request from the now configured VOIP telephone terminal 101 to initiate the configuration procedure of additional VOIP telephone terminals connected to the LAN 103. More specifically, the user at the VOIP telephone terminal 101 may send a voice request to the configuration unit 102 to request the configuration of the additional VOIP telephone terminals 107 and 108 coupled to the LAN 103. While in FIG. 1 two additional VOIP telephone terminals 107 and 108 are shown, within the scope of the present invention, any number of VOIP telephone terminals may be coupled to the LAN 103, and the configuration procedure described herein applies to the configuration of each of the VOIP telephone terminals coupled to the LAN 103.

Referring back to FIG. 5, at step 502, the voice assisted configuration unit 102 may be configured to transmit a voice command to the VOIP telephone terminal 101 to identify or send the desired parameters for the configuration of the additional VOIP telephone terminals 107, 108.

For example, in one embodiment, the user at the VOIP telephone terminal 101 at step 501 may speak into the VOIP telephone terminal 101 a command such as "Initiate Additional VOIP Telephone Configuration", and in response, the voice assisted configuration unit 102 at step 502 may transmit a voice command to the VOIP telephone terminal 101 such as "Please enter the configuration parameters that you wish to configure for the additional VOIP telephones".

Referring again to FIG. 5, the user at the VOIP telephone terminal 101 may transmit, in response to the voice command from the voice assisted configuration unit 102, a voice signal identifying the requested parameters to be configured on the additional VOIP telephones, or alternatively, a combination of voice response and the telephone keypad entries, to the voice assisted configuration unit 102 identifying the parameters to be configured on the additional VOIP telephone terminals 107, 108. For example, at step 503, the configured VOIP telephone terminal 101 may transmit to the voice assisted configuration unit 102 the configuration parameters such as IP address, gateway address and subnet mask information for the additional VOIP telephone terminals 107, 108 to be configured.

Thereafter, referring back to FIG. 5, at step 504, the voice assisted configuration unit 102 may be configured to retrieve the configuration parameters for each of the additional VOIP telephone terminals 107, 108, and transmits the respective configuration parameters to each of the additional VOIP telephone terminals 107, 108 to configure the phones. In one embodiment, each of the additional VOIP telephone terminals 107, 108 may be preconfigured with software that would enable the configuration of the additional VOIP telephone terminals 107, 108 upon receiving the transmitted configuration parameters such as IP address, gateway address, and the subnet mask information, for example, from the voice assisted configuration unit 102.

In this manner, in accordance with one embodiment of the present invention, multiple VOIP telephone terminals may be configured with the voice assisted configuration unit 102 such that, once one VOIP telephone terminal interacts with the voice assisted configuration unit 102, the other additional VOIP telephone terminals (e.g., telephone terminals 107, 108), do not require a user interaction from the additional telephone terminals to initiate and complete the configuration procedure over the LAN 103.

Additionally, as discussed in further detail below, the present invention in accordance with the various embodiments allows the VOIP phones without a display screen nor a DHCP server issuing IP addresses for terminals and devices in the data network, to properly configure the VOIP phone for voice communication over the data network. Moreover, in accordance with the various embodiments of the present invention, the configuration of the VOIP phones may be performed in conjunction with a web browser such that the voice assisted configuration is possible using a combination of a web browser on a computer terminal and the VOIP phone each connected to the LAN 103.

Indeed, in accordance with the various embodiments of the present invention, there is provided a method an system for performing pass through web configuration of VOIP phones which do not have a display screen (thus resulting in, for example, smaller, more compact design). Additionally, in accordance with the various embodiments of the present invention, the VOW phones may be easily configured in layer 2, non-DHCP environment, and further, by leveraging the existing web server configuration techniques, the VOIP phone configuration may be simplified.

Additionally, the present invention allows easy configuration of VOIP phones without displays, and further, the users are stepped through the configuration process by the voice enabled configuration system, but also provided with the configuration parameters to enter into the VOW phone resulting in less errors during the configuration phase of the VOW phone. It should be noted that the voice assisted configuration method and system in accordance with the present invention may be used to configure any VOW phone including those that include a user interface such as a display on the VOIP phone.

Indeed, in one embodiment, to initially configure or re-configure a VOIP phone's parameters such as IP address, subnet mask, NCP (Network Call Processor) IP address and so on, the user may either pick up the VOIP phone receiver and verbally request the initiation of the configuration, or alternatively, activate a configuration key on the VOIP phone. In response to the user request to initiate the configuration process of the VOIP phone, the VOIP phone is configured to initiate a call using layer 2 addressing to a known MAC address (e.g., multicast address). In one embodiment, a voice assisted configuration unit (such as a personal computer terminal) on the local area network in the same subnet as the VOIP phone may be configured to establish a call with the VOIP phone.

If the voice assisted configuration unit discussed above is already configured with an IP address, it may initiate a call using layer 3 addressing (in the re-configure case). In this case, the voice assisted configuration unit may not be limited to the same subnet as the VOIP phone. In one embodiment, the voice assisted configuration unit may be configured with a pre-recorded voice instructions or an automated call attendant program that will walk the user of the VOIP through the initial configuration process or the re-configuration process. The voice assisted configuration unit may or may not have access to the parameters that are associated with the VOIP phone that initiated the call (layer 2). If the voice assisted configuration unit does have access to the information on the VOIP phone configuration, then the voice assist program may be configured to prompt the user not only how to enter the configuration parameters, but also the actual parameters that should be entered into the VOIP phone in order to perform the VOIP phone configuration.

The various processes described above including the processes performed by the voice assisted configuration unit 102 and the VOIP telephone terminal 101 in the software application execution environment in the overall system 100 including the processes and routines described in conjunction with FIGS. 2-4, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the assisted configuration unit 102 and the VOIP telephone terminal 101, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of configuring a voice over internet protocol (VoIP) telephone terminal, comprising the steps of:
   detecting a terminal identifier address in a multicast packet transmitted by a VoIP telephone terminal associated with the terminal identifier address;
   transmitting, to the terminal identifier address, a configuration unit identifier address; and
   configuring the VoIP telephone terminal associated with the terminal identifier address by assigning an internet protocol (IP) address, a gateway address and a subnet mask information associated with the terminal in response to user input from the VoIP telephone terminal;
   wherein the configuring step includes the step of transmitting one or more voice commands to the VoIP telephone terminal associated with the terminal identifier address, the voice commands including instructions to a user for inputting information at the VoIP telephone terminal, wherein the inputted information configures the VoIP telephone terminal,
   wherein the configuration step further includes the steps of:
   receiving a voice configuration request from the VoIP telephone terminal; and
   transmitting a voice command to the VoIP telephone terminal responsive to the voice configuration request.

* * * * *